US006533594B1

(12) United States Patent
Kurup

(10) Patent No.: US 6,533,594 B1
(45) Date of Patent: Mar. 18, 2003

(54) APPARATUS AND METHOD FOR TRANSFERRING SECONDARY CURRENT ACROSS A ROBOTIC TOOL CHANGER

(75) Inventor: Prasaad B. Kurup, Raleigh, NC (US)

(73) Assignee: ATI Industrial Automation, Apex, NC (US)

( * ) Notice: Subject to any disclaimer, the term of this patent is extended or adjusted under 35 U.S.C. 154(b) by 0 days.

(21) Appl. No.: 09/714,074

(22) Filed: Nov. 16, 2000

(51) Int. Cl.$^7$ ................................................ H01R 4/60
(52) U.S. Cl. ................. 439/197; 439/191; 439/793; 439/883; 439/259
(58) Field of Search ................................ 439/310, 196, 439/197, 259, 263, 472, 792, 793, 810, 883, 262, 359, 819; 901/49, 50; 483/901

(56) References Cited

U.S. PATENT DOCUMENTS

| | | | |
|---|---|---|---|
| 1,679,723 A | * 8/1928 | Hubbell | |
| 3,333,044 A | 7/1967 | Toto | |
| 3,456,561 A | * 7/1969 | Laikam | |
| 3,838,630 A | * 10/1974 | Kobelt | |
| 3,899,162 A | * 8/1975 | Fischer | 269/25 |
| 4,420,199 A | * 12/1983 | Vis et al. | 439/13 |
| 4,917,619 A | * 4/1990 | Nishiwaki | 439/191 |
| 5,002,500 A | * 3/1991 | Zuccaro et al. | 439/197 |
| 5,460,536 A | 10/1995 | Cullen | 439/289 |
| 5,795,172 A | * 8/1998 | Shahriari | 439/260 |
| 5,928,022 A | * 7/1999 | Moeller | 439/197 |
| 6,116,966 A | 9/2000 | Little et al. | 439/700 |

FOREIGN PATENT DOCUMENTS

FR    2605465    * 10/1986

OTHER PUBLICATIONS

Article, "Robust Changer for Robotic Spot Welding", from *Automotive Manufacturing and Production Magazine*, Jan. 2000, author unknown.

* cited by examiner

*Primary Examiner*—Neil Abrams
(74) *Attorney, Agent, or Firm*—Coats & Bennett, P.L.L.C.

(57) ABSTRACT

A robotic tool changer for the transfer of a secondary current across a master module and a tool module capable of being mated together. In one embodiment, the electrical contacts on the two modules, comprising a pair of contacts with a flat plate for electrical contact and a vertical connector tab for connection to a cable, are generally the same size and shape and are interchangeable. Both sets of contacts are slideably mounted on their respective modules, and can be moved laterally relative to each other to alter the size of a gap formed between the connector tabs, to fit a variety of kickless cable terminals. The contacts on the master module may connect directly to a kickless cable terminal, and are thus cooled by a water cooling system of the kickless cable. The contacts on the tool module may connect to a pair of shunt cables. The tool module contacts are moveable from a retracted to an extended position relative to the tool module, and are biased towards the extended position by springs. The master module contacts are fixed. When the master and tool modules are mated, the tool module contacts are biased to assume a spaced apart relationship relative to the master module contacts by springs. An actuator mounted on the master module engages the tool module contacts and moves them from the extended position to the retracted position, where they abut the fixed master module contacts and establish electrical connectivity across the tool changer. When the actuator releases the tool module contacts, the springs move the tool module contacts away from the master module contacts.

48 Claims, 8 Drawing Sheets

PRIOR ART    FIG. 2

APPARATUS AND METHOD FOR TRANSFERRING SECONDARY CURRENT ACROSS A ROBOTIC TOOL CHANGER

FIELD OF THE INVENTION

The present invention relates to robotic tool changers, and more particularly to a robotic tool changer for transferring secondary current across the tool changer.

BACKGROUND OF THE INVENTION

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability. In particular, robots have found great utility in spot welding, such as in building automobile bodies from sheets of metal.

In many robotic manufacturing applications, it is cost-effective to utilize a relatively generic robot to accomplish a variety of tasks. For example, in an automotive manufacturing application, a robot may be utilized to cut, grind, or otherwise shape metal parts during one production run, and perform a variety of spot welding tasks in another. Different welding tool geometries may be advantageously mated to a particular robot to perform welding tasks at different locations or in different orientations. In these applications, a tool changer is used to mate different tools to the robot. One half of the tool changer, called the master module, is permanently affixed to a robot arm. The other half, called the tool module, is affixed to each tool that the robot may utilize. Utilities such as electrical current, air pressure, hydraulic fluid, cooling water, and the like, are fed through cables and plumbing down the robot arm, that terminate at the master module. Similar cables and plumbing carry the utilities from the tool module to the particular tool. When the tool changer halves are mated, the utilities are transferred across the changer and available at the tool.

Spot welding requires high electrical current, typically on the order of 20,000 Amperes (A). The high current is generated by a transformer that has traditionally been closely coupled to the welder, or "gun," on the end of the robot arm. This arrangement is often referred to in the art as a "transgun." Primary power, in the range of 200 A at 460 Volts (V), is typically supplied by cable along the robot arm, and is coupled through a tool changer to the transgun. Secondary power, in the range of 20,000 A at 24 V, is supplied from the transformer to the welding guns by independent, short cables known as "shunt cables." A tool changer for such a system, including the high-power coupling, is described in U.S. Pat. No. 6,116,966, issued Sep. 12, 2000 to Little, et al., entitled "High-Power Electrical Contacts for Robotic Tool Changer," and assigned to the assignee the present invention, the disclosure of which is incorporated herein in its entirety.

However, in spot welding applications requiring large guns, the weight of the tool may approach the load limit of the robot. In these applications, the welding transformer is mounted on the floor close to the robot. This configuration is referred to as a "remote" or "hip mounted" gun. In hip mounted guns, the high-current secondary power must be transferred from the transformer, along the robot arm, through a tool changer, and then to the welding gun. Because the high current densities in cables carrying secondary power generate large magnetic fields when the current changes, the cables will move, or "kick," as the welding gun cycles through the spot welding process. Resultaiitly, cables, called "kickless" cables, have been developed to facilitate the transfer of secondary power. A typical kickless cable distributes multiple positive and negative polarity conductors within a single cable sheath, such that their respective induced magnetic fields tend to cancel each other out, resulting in a cable with significantly less overall "kick." Additionally, kickless cables typically circulate water or other coolant through the interstitial spaces between conductors within the cable sheath for thermal cooling. Kickless cables are terminated with a connector that typically comprises opposite polarity plates bound together, with an insulator disposed between them. The connectors additionally contain connection points for the circulation of coolant. To span short spaces, such as from the tool changer to the welding gun, shunt cables are typically used.

SUMMARY OF THE INVENTION

The present invention comprises a robotic tool changer, having a master module and a tool module adapted to be coupled and decoupled. A first pair of electrical contacts is associated with the master module and a second pair of electrical contacts is associated with the tool module. At least one of the pair of contacts is moveable between an extended and retracted position, and is biased towards the extended position. When the master and tool modules assume a coupled relationship, the first and second pair of contacts are disposed adjacent to each other. When coupled, and when the moveable pair of contacts assumes the extended position, the first and second pairs of contacts are disposed in a spaced apart relationship. An actuator is associated with the robotic tool changer for engaging the moveable pair of contacts and moving the moveable pair of contacts to the retracted position, where the moveable pair of contacts engage the other pair of contacts and establishes an electrical connection between the first and second pairs of contacts.

According to one embodiment of the present invention, a robotic tool changer is adapted to connect directly to a kickless cable carrying a secondary current. The tool changer includes a master module and a tool module adapted to be coupled and decoupled, with a pair of contacts secured to the tool module, and a pair of contacts secured to the master module. Each of the master module contacts includes a contact surface and a connector tab. The pair of master module contacts are arranged and spaced such that the associated connector tabs cooperate to directly receive and connect to the kickless cable.

In another embodiment, the present invention comprises a system for transferring secondary current across a robotic tool changer having a master module and a tool module matable to each other. The system includes a first pair of horizontally aligned contacts slideably mounted to the master module and laterally adjustable thereon, each contact having a horizontal plate for establishing electrical contact and a vertical connector tab for attachment to an electrical cable. The system also includes a pneumatic actuator associated with the master module and selectively moveable between extended and retracted positions. Additionally, the system includes a second pair of horizontally aligned contacts, each contact having a horizontal plate for establishing electrical contact and a vertical connector tab for attachment to an electrical cable, wherein the second pair of contacts are slideably mounted to the tool module and are both laterally adjustable thereon and moveable vertically between extended and retracted positions. Finally, the system includes at least one spring disposed between the tool module and each of the second pair of contacts for biasing the second pair of contacts to the extended position, where the contacts are disposed in spaced apart relationship to the first pair of contacts when the master and tool modules are mated. When the actuator is selectively actuated, the actuator engages the second pair of contacts and moves the second pair of contacts from the extended position to the retracted position, where the second pair of contacts engages the first pair of contacts and forms an electrical connection therebetween.

DETAILED DESCRIPTION OF THE INVENTION

Figure 1:
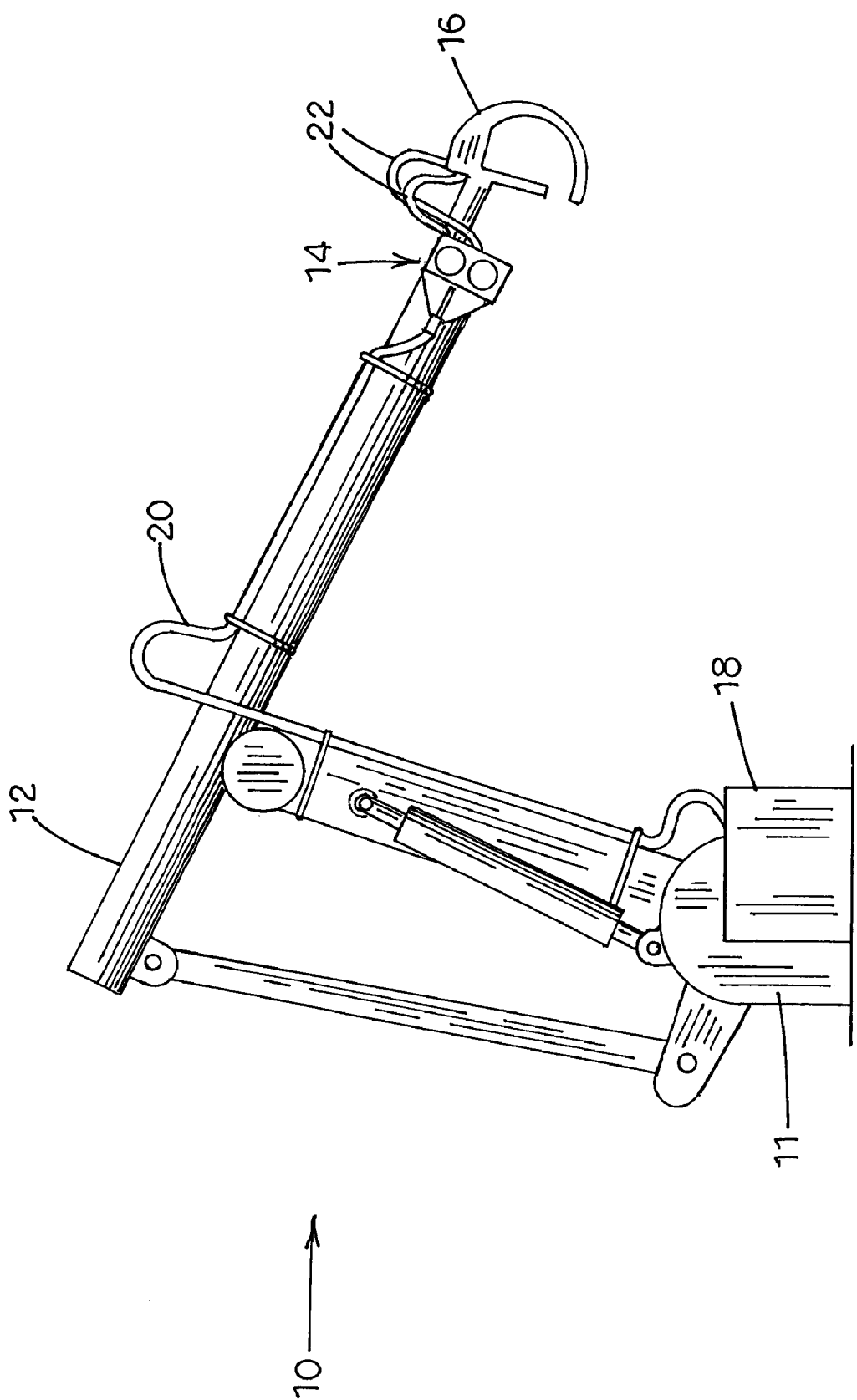
FIG. 1 is schematic diagram of a robot arm having the tool changer of the present invention incorporated and with a hip mounted welding gun attached to the tool changer.

FIG. 1 depicts a robot, as may be used in a wide variety of manufacturing applications, indicated generally by the numeral 10. The specific configuration of connectors, actuators, linkages, and the like, may vary broadly depending on the application and the particular design of the robot. Generally, robot 10 comprises a base 11 and an arm 12 that is supported by the base 11 through a series of connecting linkages. Secured to the terminal end of the arm 12 is a tool changer, indicated generally by the numeral 14. As will be appreciated from subsequent portions of the disclosure, the tool changer 14 includes a pair of mating modules, a master module and a tool module. The master module is adapted to be secured to the terminal end of the arm 12 while the tool module is adapted to be coupled to the master module and typically includes a tool, such as a welding gun, connected thereto. Thus, it is appreciated that the robot 10 may accommodate a variety of tools, with each tool having its own tool module secured thereto and wherein each of the tool modules would be adapted to connect to the master module supported on the terminal end of the robot arm 12.

In the example depicted in FIG. 1, robot 10 is equipped with a spot welding gun 16. In operation, welding gun 16 requires high electrical current, supplied by the secondary side of a hip-mounted transformer 18. Secondary current is transferred from transformer 18 to tool changer 14 through a kickless cable 20. Kickless cable 20 is specifically designed to transfer secondary current in high current applications such as spot welding. According to the present invention, the kickless cable 20 connects directly to one module of the tool changer 14. Secondary current is transferred through the master module of the tool changer 14 to the tool module which has the welding gun 16 mounted thereto. Secondary current is transferred from the tool module of the tool changer to the welding gun 16 by a pair of shunt cables 22.

Tool changer 14 increases the versatility of robot 10, allowing the robot 10 to be utilized to perform a wide variety of manufacturing operations. As noted above, tool changer 14 typically comprises two modules designed and configured to be coupled together and decoupled. Tool changer 14, in addition to mechanically coupling various tools to robot arm 12, additionally supplies utilities from the robot 10 to the tool attached to the end of robot arm 12. These utilities may include electrical power, pressurized air, hydraulic fluid, control and communication signals, and the like. According to the present invention and as depicted in FIG. 1, tool changer 14 is adapted to transfer current from transformer 18 to the welding gun 16. This secondary current can be very high, typically on the order of 20,000 A. Thus, tool changer 14 must include electrical contacts designed, arranged, and selectively mated so as to effectively transfer the high secondary current from the master module to the tool module.

Figure 2:
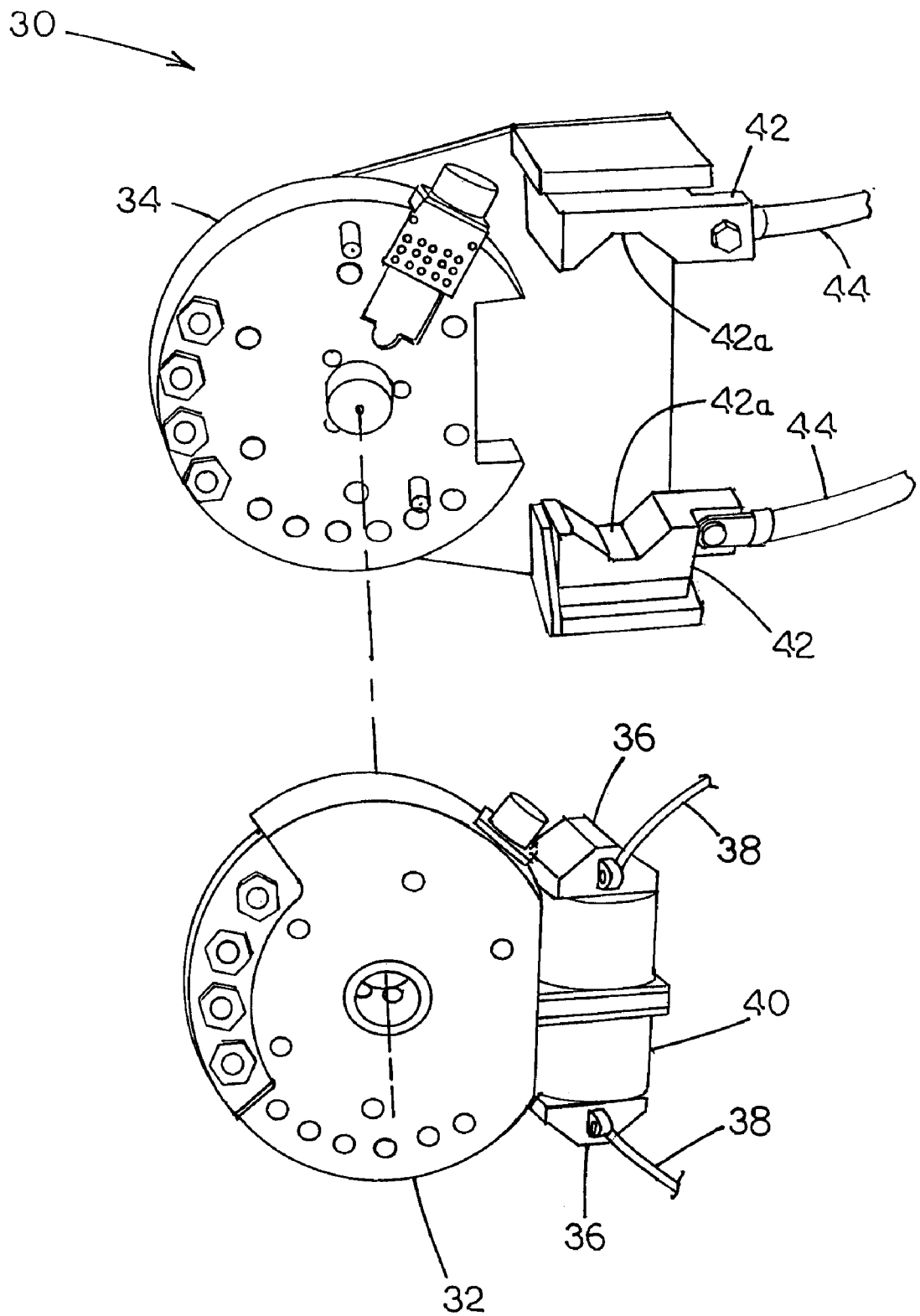
FIG. 2 is a perspective drawing of a prior art tool changer.

Robotic tool changers designed and adapted to transfer a secondary current are known in the art. One such prior art tool changer is shown in FIG. 2, and indicated generally by the numeral 30. This prior art tool changer 30 includes a master module 32 and a tool module 34. As explained above, the master module 32 is adapted to be connected to the terminal end of a robot arm while the tool module 34 is adapted to be, connected or secured to a particular tool and at the same time is adapted to be coupled to the master module 32. In the case of the prior art tool changer 30 shown in FIG. 2, the master module 32 includes a pair of electrical contacts 36. These electrical contacts 36 are secured on opposite ends of an actuator 40. Although not specifically shown, the actuator 40 basically comprises a pair of opposed pneumatic cylinders with each cylinder being operatively connected to one of the electrical contacts 36. By actuating the actuator and the two pneumatic cylinders, it is appreciated that the contacts 36 can be extended and retracted.

The tool module 34 also includes a pair of electrical contacts 42. More particularly, each contact 42 includes an inner irregular face 42a that is designed to receive and contact one of the contacts 36 associated with the master module 32.

Connected to the contacts 36 associated with the master module 32 is a pair of shunt cables 38 that supply current to the contacts 36. Extending from the contacts 42 associated with a tool module 34 are a pair of shunt cables 44. Shunt cables 44 typically extend from the tool module 34 to a tool such as a welding gun that is carried by the tool module 34.

In operation, the master module 32 and the tool module 34 are adapted to be coupled together. When the master module 32 is coupled to the tool module 34, it is appreciated that the contacts 36 will assume a position generally between the contacts 42 of the master module 34. By actuating the actuator 40, the pneumatic cylinders associated with the actuator will be extended causing the contacts 36 to be driven into engagement with the inner contact faces 42a that form a part of the tool module contacts 42. This establishes electrical contact between the electrical contacts 36 of the master module 32 and the electrical contacts 42 of the tool module 34. With electrical connectivity thus established, secondary current can flow from one respective shunt cable 38, through a master electrical contact 36, to an electrical contact 42 associated with the tool module 34. From there, the electrical current is directed from the electrical contact 42 through the shunt cable 44 to a particular tool such as a welding gun. Return current flows through the other shunt cables and contacts in an analogous manner.

While the prior art tool changer 30 shown in FIG. 2 is generally sufficient to transfer a secondary current from a robot to a tool such as a welding gun, it is deficient in several respects. For example, and as is more fully explained herein below, the tool changer 30 is not particularly designed to connect directly to a kickless cable that usually terminates in a single, unified dual polarity terminal end. More particularly, as seen in FIG. 2, the contacts 36 carried by the master module 32 are incapable of directly coupling to such a kickless cable. Thus, an adaptor must be attached between the kickless cable and the contacts 36 of the master module 32. More particularly, this is ordinarily achieved by extending the shunt cables 38 from the contacts 36 to the terminal end of the kickless cable. The utilization of the shunt cables 38 tends to give rise to a problem. Due to the "kick" induced in high current cables by transient electro-magnetic forces, and the strain placed on the cables by the contortions of an associated robotic arm and tool, a rotational force may be induced on the electrical contacts 36. To address this problem of the electrical contacts 36 tending to rotate and misalign with the contacts 42 of the tool module 34, some of the tool changers of the prior art have attempted to utilize alignment pins and other means to eliminate the rotation of the electrical contacts 36 induced by the "kick" that occurs in the shunt cables 38.

Figure 3:
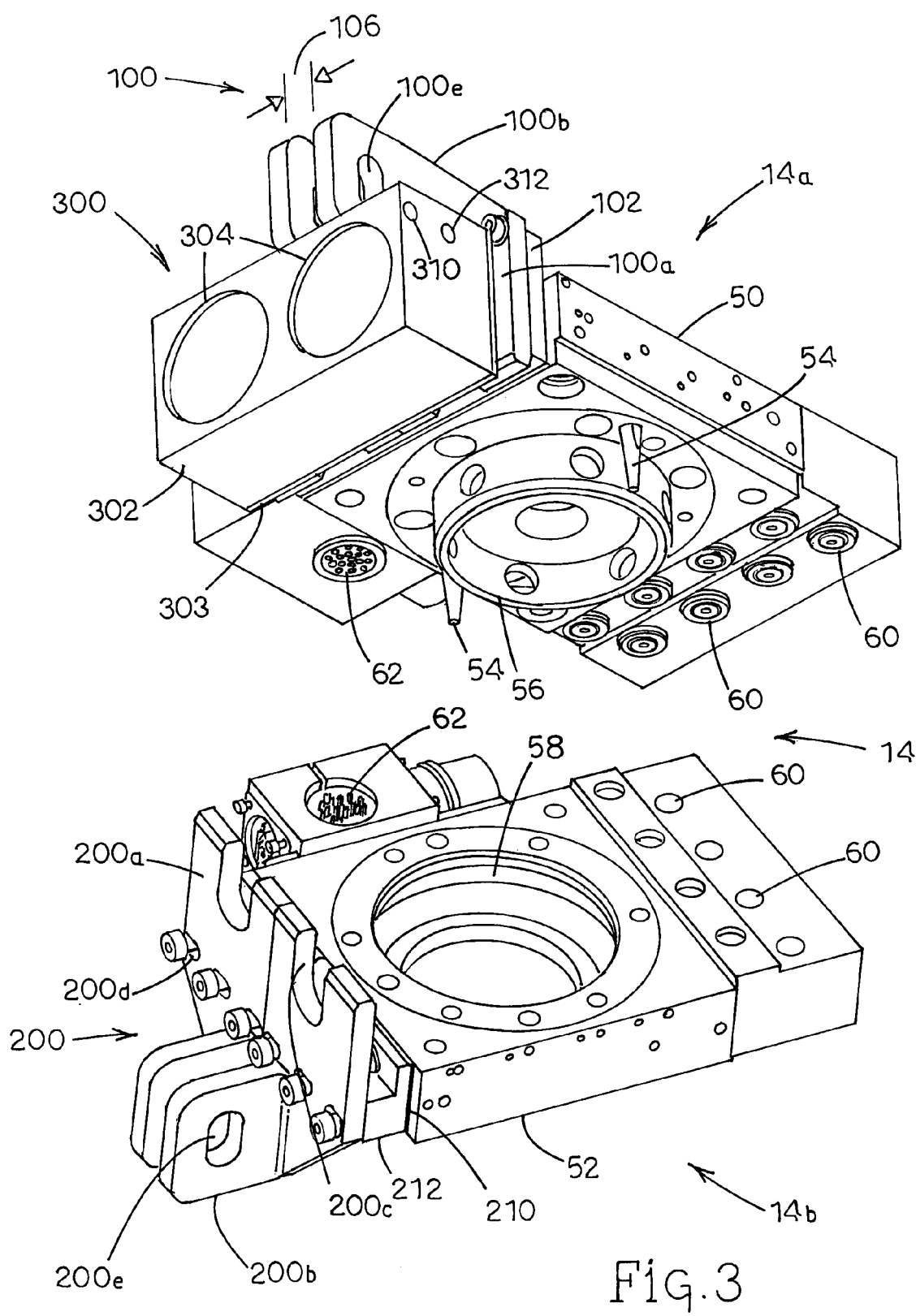
FIG. 3 is a perspective drawing of the master and tool modules of the tool changer according to one embodiment of the present invention.

A tool changer 14 according to the present invention is depicted in one embodiment in FIG. 3. Tool changer 14 comprises a master module, indicated generally by 14a, and a tool module, indicated generally by 14b. Master module 14a is designed and configured to be affixed to the end of robot arm 12. Tool module 14b is designed and adapted to be affixed to any of an array of tools that may be connected to robot arm 12, and specifically to a welding gun 16 requiring secondary welding current. Master module 14a includes master block 50. Tool module 14b includes tool block 52. Cooperative coupling mechanisms are associated with master block 50 and tool block 52, to effectuate the coupling and decoupling of master module 14a and tool module 14b. Alignment pins 54 on master block 50 mate with corresponding receptacles on tool block 52, to ensure mechanical alignment of the two modules when coupled together. Master block 50 also includes a connecting collar 56 with openings in the circumference thereof. Connecting collar 56 docks into a receiving aperture 58 formed in tool block 52 when the modules are coupled. A retaining mechanism (not shown) that may include pneumatic, hydraulic, or electromechanically actuated devices, engages the connecting collar 56 to secure the master module 14a and tool module 14b together when the modules are coupled. Details of the coupling mechanisms are not discussed herein in detail because such is not per se material to the present invention and further such coupling mechanisms for coupling the modules of a tool changer are well known and appreciated in the art.

In addition to mechanically coupling various tools to robot arm 12, tool changer 14 effects the transfer of various utilities from the robot 10 to the tool deployed on robot arm 12. These utilities may include, for example, pressurized air, hydraulic fluid, control and communications signals, secondary welding current, and the like. Specifically, tool changer 14 is equipped with fluid ports 60 for the transfer of various fluids, and electrical signal connectors 62 for the transfer of control and communications signals.

Other units or systems may be attached to tool changer 14 to transfer other utilities from robot 10 to the attached tool, as desired or required for a particular application. In particular, according to the present invention, a system for transferring secondary current is provided. This system comprises master electrical contacts 100, tool electrical contacts 200, and an actuator 300, along with various associated parts as will be described herein. In describing the secondary current transfer mechanism of the present invention, reference is made generally to FIGS. 3–8, each of which depicts various specific details. As is described more fully herein, master electrical contacts 100 and tool electrical contacts 200 may be of the same general size and shape, exhibit the same characteristics and features, and are interchangeable. The features and characteristics of the respective contacts are numbered correspondingly, so reference may be made to either pair of contacts in the associated drawings for a full and complete understanding thereof.

As seen in the drawings, the master contacts 100 are mounted on the master module 14a. Each of the master contacts 100 comprises a flat plate portion 100a and an upturned connecting tab 100b. The plane of each connecting tab 100b is generally perpendicular to the flat plate portion 100a of the associated master contact 100. The flat plate portion 100a includes a rod cut-out (not shown) and a plurality of elongated slots 100d formed therethrough. See FIG. 4. The upturned connector tab 100b contains an elongated slot 100e formed therethrough.

Master contacts 100 may be formed of any appropriate material, exhibiting sufficient mechanical rigidity and electrical conductivity. In one embodiment, master contacts 100 are formed from silver-plated copper. Master contacts 100 may be formed by any suitable manufacturing operation. The contacts are designed such that they may be cut from a flat stock of metal, with connector tab 100b subsequently bent into an upturned configuration. However, master contacts 100 may be formed by any conventional process, including milling, casting, and the like.

A plate 102 is secured to master block 50 of master module 14a. See FIGS. 3, 7, and 8. Overlying plate 102 is insulator 103. Master electrical contacts 100 are secured to plate 102 by insulated or non-conducting threaded fasteners 104, extending through elongated slots 100d. Master contacts 100 are affixed to plate 102 in a side-by-side configuration, with the upturned connector tabs 100b of each connector proximate each other. Master contacts 100 are slideably mounted on plate 102, and laterally adjustable thereon, by virtue of elongated slots 100d. When the threaded fasteners 104 are loosely secured in their corresponding tapped holes in plate 102, the distance between master contacts 100 may be adjusted by sliding each master contact 100 laterally with respect to the other. Placement of the tapped holes in plate 102 for receipt of fasteners 104 relative to the inside edge of each elongated slot 100d ensures that in when adjusted to their closest position, master contacts 100 will not touch along their inside edge. This is necessary to avoid a short-circuit between the contacts.

Figure 4:
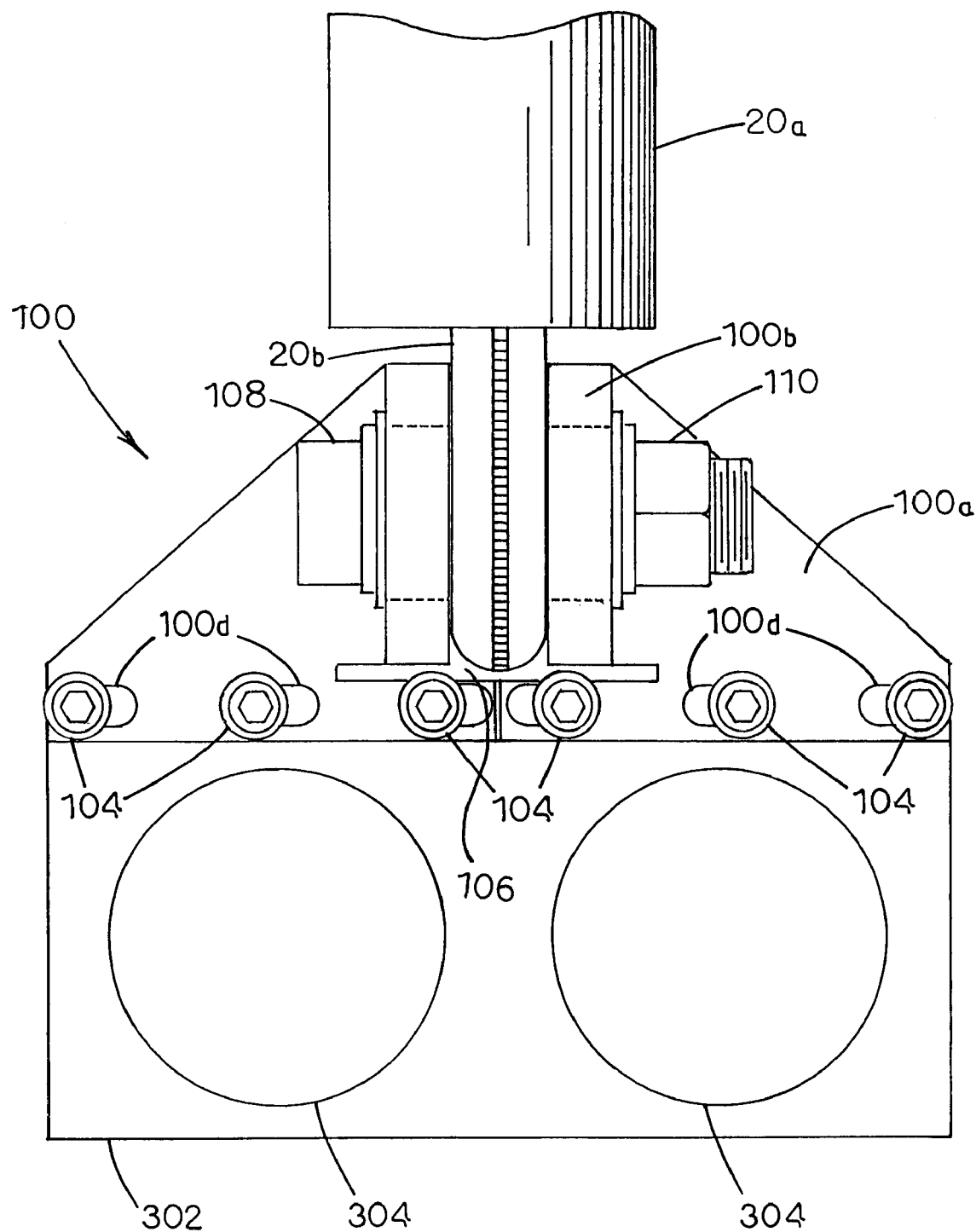
FIG. 4 is a plan view of the master module of the tool changer illustrating the attachment of a kickless cable to a pair of contacts associated with the master module.

With particular reference to FIG. 4, it will be noted that the gap formed between the two upturned connector tabs 100b may receive an electrical cable for connection to master contacts 100. Furthermore, the size of the gap 106 between connector tabs 100b is adjustable by lateral movement of master contacts 100 relative to each other on plate 102, via elongated slots 100d (FIG. 3). Thus, a variety of electrical cable connector terminals can be fitted within gap 106.

Specifically, the upturned connector tabs 100b and the adjustable gap 106 formed therebetween, may receive and directly connect to the terminal end of a kickless cable 20. Kickless cable 20 is an electrical cable specifically designed to carry high currents in welding applications. See FIG. 4. The main body 20a of kickless cable 20 comprises a plurality of electrical conductors contained within an insulated sheath and configured in such a way as to minimize mechanical motion induced by transient electromagnetic fields, by countering the induced fields from each conductor. The main body 20a of kickless cable 20 is additionally configured to circulate water or other cooling fluid through the interstitial spaces within the insulating sheath, to effect thermal cooling of the kickless cable 20. Kickless cable 20 includes terminal end portion 20b. Terminal end portion 20b is an electrical terminal comprising two opposite polarity conductors separated by an insulating spacer. Terminal end portion 20b contains a bore or opening therethrough for connection to electrical contacts. Kickless cable 20 connects directly to the master contacts 100 by inserting terminal end portion 20b into the gap 106 formed between upturned connector tabs 100b, and adjusting master contacts 100 laterally via elongated slots 100d to position connector tabs 100b so as to abut each side of terminal end portion 20b. Terminal end portion 20b of kickless cable 20 is secured between connector tabs 100b of master contacts 100 by insulated bolt 108 inserted through elongated connector tab slots 100e and the bore through terminal end portion 20b. Insulated bolt 108 is secured by nut 110. In addition to the lateral adjustment of gap 106 described above, the provision of elongated connector tab slot 100e allows for a wide variety of sizes and shapes of terminals to connect directly to master contacts 100.

Figure 5:
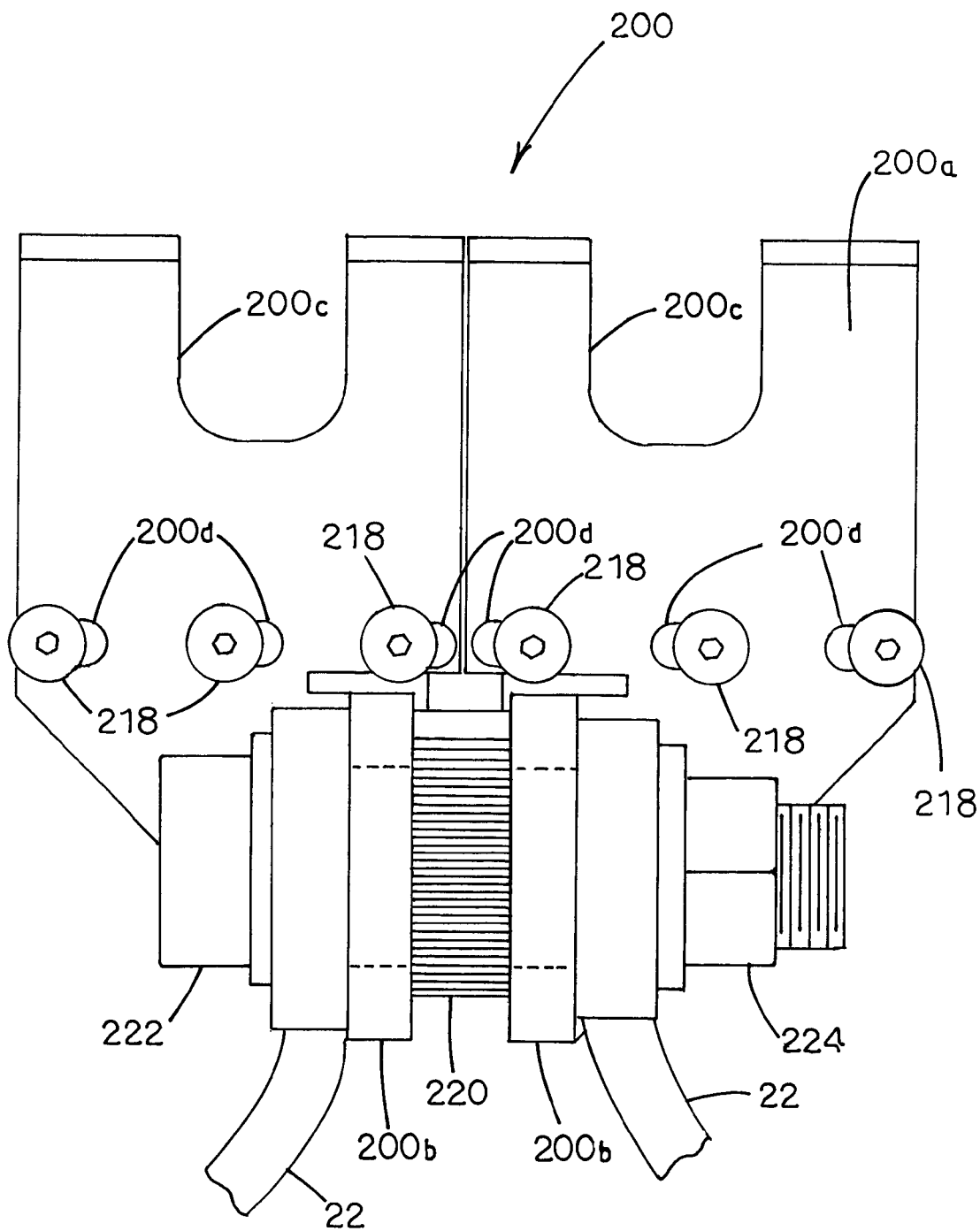
FIG. 5 is a plan view of the tool module of the tool changer illustrating the attachment of a pair of cables attached to the contacts associated with the tool module.
Figure 6:
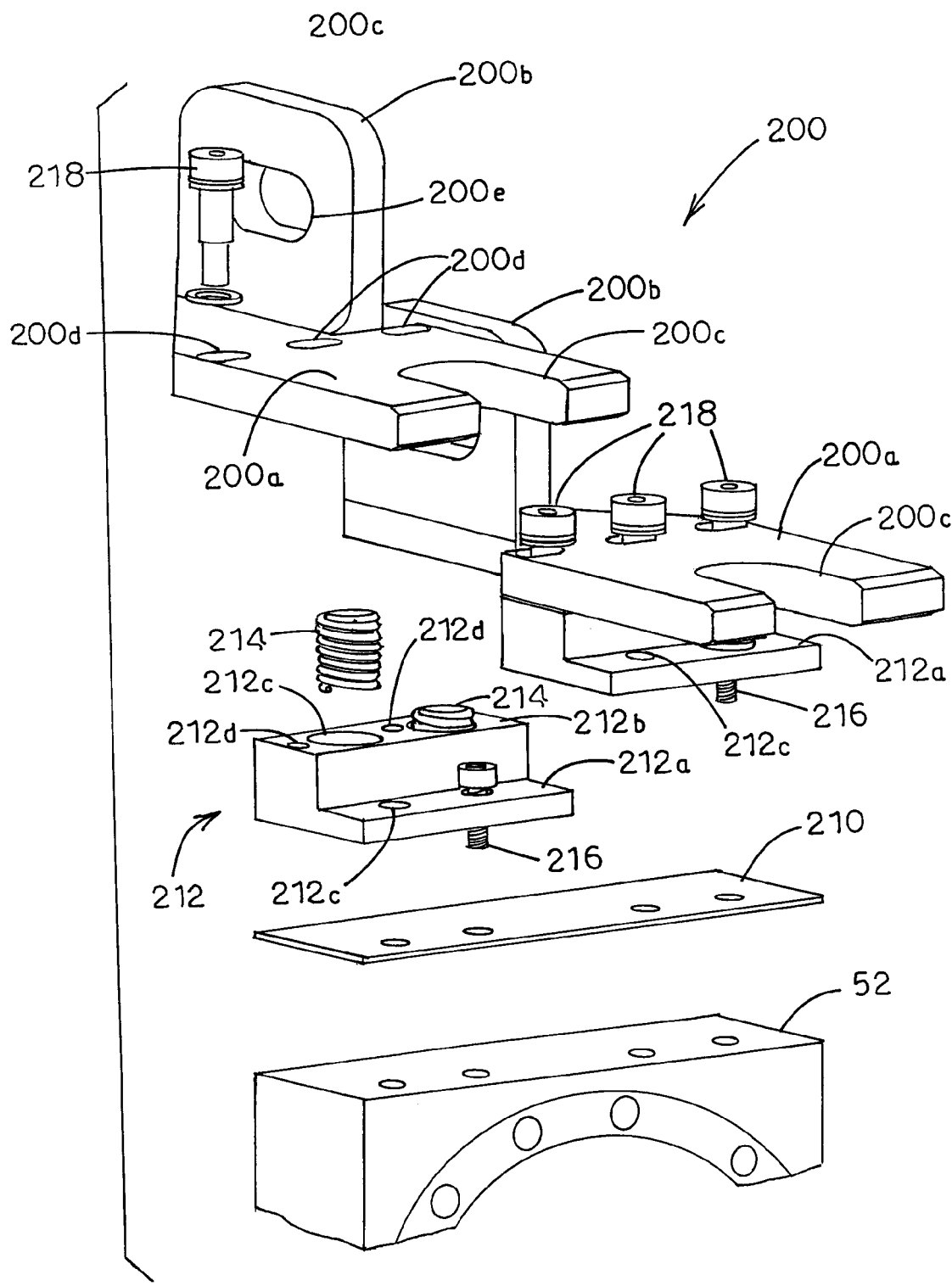
FIG. 6 is an exploded perspective view of a portion of the tool module.

Referring to FIGS. 3, 5, and 6, associated with tool module 14b are a pair of tool electrical contacts 200. Tool electrical contacts 200 are similar to master electrical contacts 100. Tool contacts 200 each comprise a flat plate portion 200a, and an upturned connecting tab 100b. Connecting tab 100b lies in a plane generally perpendicular to the plane of flat plate portion 100a. Formed in the center of flat plate portion 100a, opposite upturned connecting tab 100b, is a rod cut-out 100c. Formed through the flat plate portion 200a is a plurality of elongated slots 200d. Similarly, formed through connector tab 200b is elongated slot 200e.

In operation, tool changer 14 may in general assume any orientation with respect to an arbitrary reference frame. For the purposes of explication herein however, the following frame of reference is adopted. As used herein, a "horizontal" plane is the plane of the flat plate portion 200a of tool contacts 200. Since when the master module 14a and the tool module 14b of tool changer 14 are coupled together, the master contacts 100 lie adjacent the tool contacts 200 (as will be explained more fully herein), the flat plate portion 100a of master electrical contacts 100 also lie in a horizontal plane. Correspondingly, the plane of the upturned connector tabs 200b of tool contacts 200, being generally perpendicular to the plane of the flat plate portion 200a, is defined as "vertical." Connector tabs 100b of master electrical contacts 100 similarly lie in a vertical plane.

The master electrical contacts 100, once adjusted laterally via elongated slots 100d to adjust gap 106 to accommodate a given kickless cable terminal end 20b, are generally fixed, i.e., securely attached to plate 102. Contrastingly, tool electrical contacts 200, while also laterally adjustable via elongated slots 100d, are additionally moveable between a retracted position and an extended position. This movement of tool contacts 200 will be explained in the context of their mounting to tool module 14b, with particular reference to FIG. 6.

Overlying tool block 52 is an insulator strip 210, which electrically isolates tool contacts 200 and their associated mounting hardware from the rest of the tool module 14b. Overlying insulating strip 210 is a pair of supports 212, each comprising a lower ledge 212a and an upper ledge 212b. See FIG. 6. Formed through the lower ledge 212a is a plurality of openings 212c. Formed in upper ledge 212b is a plurality of tapped bolt openings 212d, and at least one spring cavity 212c. Spring cavities 212c are adapted to receive springs 214, which, in their rest position, extend from their associated spring cavity 212c above the surface of upper ledge 212b. Insulated or non-conductive fasteners 216 extend through lower ledge openings 212c and through corresponding openings formed in insulator 210 for attachment to corresponding tapped openings in tool block 52. Fasteners 216 thus secure supports 212 and insulator 210 to the tool module 14b. Fasteners 218 extend through elongated slots 200d in tool electrical contacts 200 and thread into corresponding tapped bolt openings 212d formed in the upper ledge 212b of the supports 212. Similarly to master contacts 100, tool electrical contacts 200 are moveable with respect to each other via elongated slots 100d. Unlike master contacts 100, however, tool contacts 200 are not rigidly secured to supports 212 by tightening fasteners 216. Rather, fasteners 216 exhibit an offset (that is, the head of each fastener is slightly spaced above the upper surface of the plate portion 200a of the contact 200) when tool contacts 200 are depressed against supports 212. Thus, tool contacts 200 are moveable between a retracted position in which the contacts 200 are abutting supports 212, and an extended position where the contacts 200 are spaced over supports 212. Springs 214, disposed in spring cavities 212c in supports 212, mechanically bias tool contacts 200 towards the extended position, i.e., away from supports 212. By applying a downward force on tool contacts 200, the contacts 200 may be moved from the extended position to the retracted position where they abut against supports 212.

Referring to FIG. 5, the attachment of shunt cables 22 to tool electrical contacts 200 is shown. Shunt cables 22 are preferably mounted to the respective outside faces of connector tabs 200b, i.e., not within the space defined between connector tabs 200b. Rather, insulating spacer 220 having a hole or bore formed therethrough is inserted into the gap defined between the tool contact connector tabs 200b. Shunt cables 22 and insulating spacer 220 are attached to tool connector tabs 200b by an insulated or non-conducting bolt 222 and nut 224. Note that lateral adjustment of tool contacts 200 will normally not be necessary, and insulating spacer 220 may be used in the connection of a broad array of variously sized shunt cables 22. Preferably, insulating spacer 220 is of width, i.e., dimension in the axial direction of insulated bolt 222, sufficient to ensure a slight gap between the flat plate portions 200a of tool contacts 200. This ensures that tool contacts 200 do not touch each other, thus avoiding electrical short circuit, and leaves the maximum amount of space to the sides of connector tabs 200b for access to insulating bolt 222, nut 224, and various connector hardware, i.e., insulating spacers, washers, lock washers, and the like, as may be desired or required in a given application.

Also associated with master module 14a is actuator 300, described herein with particular reference to FIGS. 3, 4, 7, and 8. Actuator 300 includes a housing 302 and electrical insulator 303. Formed within housing 302 are at least two side-by-side cylinders 304. Cylinders 304 each contain a piston 306 moveable within the cylinder in an axial direction. Attached to each piston 306 and extending from housing 302 is an actuating rod 308. Each actuating rod 308 extends through housing 302, through a corresponding aperture formed in insulator 303, through the rod cut-out 200e formed in each respective tool contact 200, through a corresponding rod cut-out formed in each master contact 100, through an aperture formed in insulator 103 and is affixed to plate 102. Housing 302 contains fluid or air ports 310 and 312 formed in the sidewall of housing 302. For purposes of reference, port 310 is referred to as an extend port while port 312 is referred to as a retract port. Connected to ports 310 and 312 are fluid transfer lines (not shown) for directing air to and from actuator 300.

Actuator 300 is preferably a pneumatic actuator. Accordingly, pistons 306 are actuated back and forth within housing of 302 by pressurized air. In the embodiment illustrated herein, pistons 306 are double acting. That is, pressurized air can be directed into one port, 310 or 312, causing the pistons to move in one direction—or directed in the other port, resulting in the piston moving in the opposite direction. It is appreciated that when air is directed into one port, 310 or 312, air will be exhausted out the other port.

Since the pistons 306 are attached to rigid actuating rods 308, which are affixed to mounting plate 102, actuation of the pistons 306 results in reciprocal movement of the housing 302 in the axial direction of cylinders 304. Thus, plate 102 affixed to master block 50 may be considered a mounting plate for the mounting of master contacts 100 thereon, or alternatively may be considered part of the actuator 300, as it is firmly attached to actuating rods 308. As part of actuator 300, plate 102 eliminates any induced rotational forces on actuating rods 308. That is, pistons 306 and actuating rods 308 are limited to rectilinear motion in the axial direction of cylinders 304.

Figure 7:
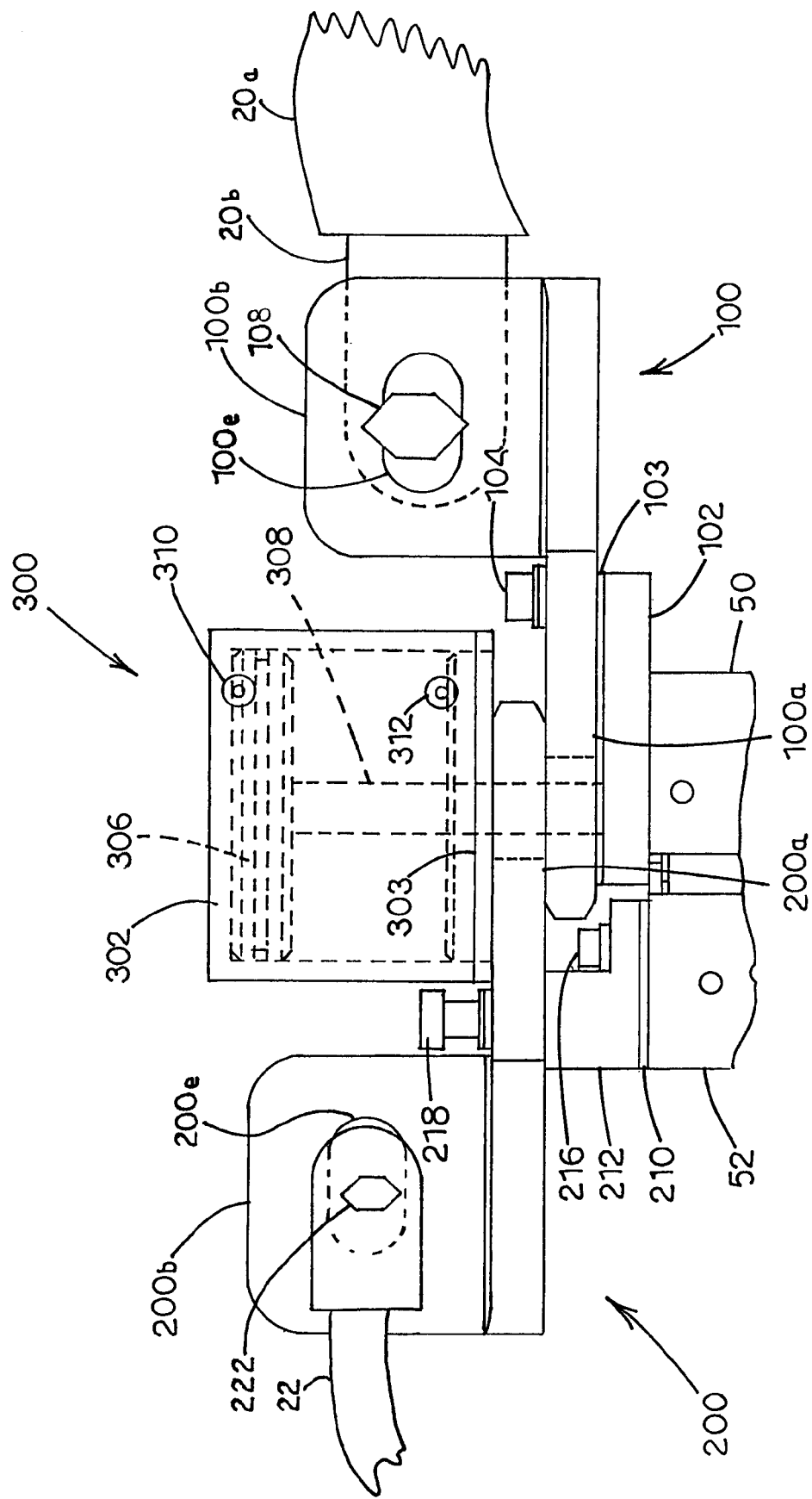
FIG. 7 is a fragmentary side-elevational view showing the master and tool modules coupled together, with the master and tool contacts engaged.
Figure 8:
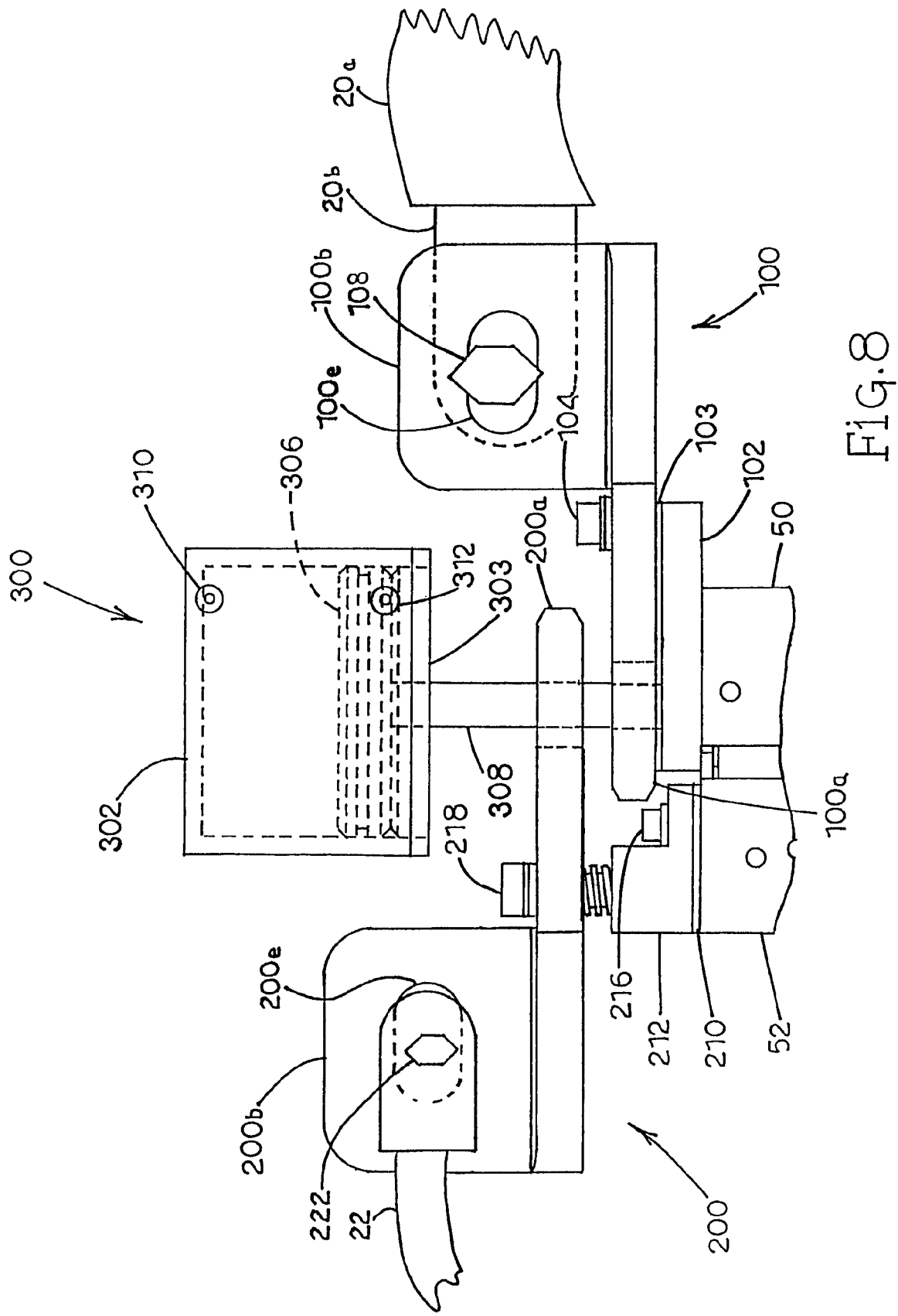
FIG. 8 is a fragmentary side-elevational view showing the master and tool modules coupled together, with the master and tool contacts disengaged.

The operation of actuator 300 is described with particular reference to FIGS. 5, 7, and 8. Initially, actuator 300 is placed in an extended position, wherein pistons 306 are moved to the ends of cylinders 304 proximate to master contacts 100, i.e., wherein housing 302 is at its maximum distance from master contacts 100. See FIG. 8. When master module 14a and tool module 14b are coupled together, tool contacts 200, being offset from tool block 52 by supports 212, are disposed over master contacts 100, and no electrical contact is made between master contacts 100 and tool contacts 200. Tool contacts 200 are biased to their extended position by springs 214.

After the master module 14a and tool module 14b are coupled, actuator 300 moves to a retracted position by forcing pneumatic fluid into retract port 312 and out of extend port 310. This moves the actuator housing 302 towards the attached plate 102. See FIG. 7. In the process, actuator housing 302 engages tool contacts 200, moving tool contacts 200 from the extended to the retracted position, thus forcing them into physical contact with underlying master contacts 100. Electrical connectivity is thus established between tool contacts 200 and master contacts 100.

FIG. 7 depicts tool changer 14 in the coupled and engaged position. To disconnect the tool contacts 200 from the master contacts 100, the acutator 300 is selectively actuated such that the housing 302 moves from its retracted position to an extended position. Here pressurized air is directed into the extend port 310 causing the pistons 306 and the associated actuating rods 308 to be extended. This results in the actuator housing 302 moving upwardly from its retracted position, as shown in FIG. 8. As the actuator housing 302 moves up, this results in the actuator housing 302 moving away from the tool contacts 200. Tool contacts 200, being biased by springs 214, move from the retracted to the extended position, breaking contact with master contacts 100. Master module 14a and tool module 14b may then be decoupled.

Thus, according to the present invention, when master module 14a and tool module 14b are mated, and when the tool contacts 200 are engaged by the actuator 300 and brought into contact with master contacts 100, an effective and efficient connection for the transfer of secondary current from the robot 10 to a tool such as the welding gun 16 is established. Specifically, secondary current is transferred from the secondary side of transformer 18, through kickless cable 20, through kickless cable terminal 20b, through master contacts 100, through tool contacts 200, through shunt cables 22, and to the tool or welding gun 16. This electrical connection is preserved and isolated from the remainder of tool changer 14.

In the embodiment illustrated and described, the master contacts 100 are fixedly mounted on the master module 14a, and tool contacts 200 mounted on the tool module 14b are moveable. Nothing in the present invention compels this result, however, and in the broad practice of the present invention, either pair of contacts may be fixed or moveable.

The master contacts 100 and tool contacts 200 of the present invention are generally of like size, shape and design, and are hence interchangable. This may result in cost savings through more efficient manufacture, reduced parts count, greater interoperability, etc. The contacts are additionally designed to accommodate and attach to a broad variety of cables and cable terminals. The lateral adjustment of master contacts 100, as well as the elongated connector tab slot 100e, allow for attachment to a variety of kickless cable terminal ends. If required or desired in any application, however, master contacts 100 may connect to shunt cables, using insulated spacer 220 or the like between connector tabs 100b. Tool contacts 200 may likewise connect to a broad array of shunt cables, and additionally may connect directly to kickless cable terminal ends, if required or desired, via lateral adjustment and elongated connector tab slot 200e.

It is appreciated that the kickless cable 20, as shown in FIG. 4, can be directly connected to the master contacts 100 secured on the master module 14a. As already discussed, many kickless cables are provided with internal water-cooling. Thus, the direct coupling of the kickless cable to the master contacts 100 may result in some thermal cooling of the master contacts.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the spirit and scope of the invention as claimed herein.

What is claimed is:

1. A robotic tool changer adapted to connect directly to a kickless cable carrying a secondary current comprising:

a. a master module and a tool module adapted to be coupled and decoupled;

b. a pair of contacts secured to the tool module; and c. a pair of contacts secured to the master module, each of the master module contacts including a contact surface and a connector tab and wherein the pair of master module contacts are arranged and spaced such that the associated connector tabs cooperate to directly receive and connect to the kickless cable; and d. wherein each contact associated with the master module includes a generally flat plate portion that forms the contact surface and wherein the connector tab of each master module contact is integral with the flat plate portion and assumes a turned up orientation relative to the flat plate portion.

2. The robotic tool changer of claim 1 wherein the kickless cable includes a terminal and wherein the connector tabs of the contacts associated with the master module defines a space there between for receiving the terminal of the kickless cable.

3. The robotic tool changer of claim 2 wherein the contacts secured to the master module are laterally adjustable such that the space between the connector tabs of the contacts associated with the master module may be adjusted so as to accommodate kickless cable terminals of different sizes.

4. The robotic tool changer of claim 2 wherein the terminal is secured between the connector tabs by an elongated connector adapted to extend through an opening formed in each connector tab and an opening formed in the terminal of the kickless cable.

5. The robotic tool changer of claim 4 wherein the elongated connector includes a bolt and nut assembly.

6. The robotic tool changer of claim 4 wherein the opening formed in each connector tab is elongated such that the terminal of the kickless cable can be adjustably positioned between the connector tabs.

7. The robotic tool changer of claim 1 wherein the contacts of the tool module are generally similar to the contacts of the master module in design, shape and size such that the contacts of the master and tool modules are interchangeable.

8. The robotic tool changer of claim 1 wherein when the tool changer assumes a coupled position one pair of the contacts at least partially overlies the other pair of contacts, and wherein one pair of the contacts is moveable relative to the other pair of contacts and is biased to assume a spaced-apart relationship relative to the other pair of contacts, and wherein the tool changer is provided with an actuator for engaging the moveable pair of contacts and moving the moveable pair of contacts into engagement with the other pair of contacts such that an electrical connection is established between the two pair of contacts.

9. The robotic tool changer of claim 8 wherein the respective contacts of each pair of contacts are laterally adjustable and wherein the moveable pair of contacts are biased to the spaced-apart position relative to the other pair of contacts by at least one spring.

10. A robotic tool changer, comprising:

a. a master module and a tool module adapted to be coupled and decoupled;

b. a first pair of electrical contacts associated with the master module and a second pair of electrical contacts associated with the tool module;

c. at least one of said pair of contacts being moveable between an extended and retracted position and being biased towards the extended position;

d. wherein when said master and tool modules assume a coupled relationship, said first and second pair of contacts are disposed adjacent to each other and wherein when said moveable pair of contacts assumes the extended position, said first and second pairs of contacts are disposed in spaced apart relationships; and e. an actuator associated with the robotic tool changer for engaging the moveable pair of contacts and moving said moveable pair of contacts to the retracted position where said moveable pair of contacts engages the other pair of contacts and establishes an electrical connection between said first and second pairs of contacts.

11. The robotic tool changer of claim 10 wherein each contact of the first and second pair of contacts includes a plate portion and a connector tab, and wherein said contacts of each pair are laterally adjustable such that the distance between said associated connector tabs can be adjusted, thereby permitting the robotic tool changer to be connected to electric cables of various width.

12. The robotic tool changer of claim 11 wherein the plate portion and the connector tab of each contact are of an integral one-piece construction with the connector tab being turned up relative to the plate portion.

13. The robotic tool changer of claim 12 wherein said connector tab of each contact lies in a plane generally perpendicular to the plane of said plate portion of that contact.

14. The robotic tool changer of claim 11 wherein each contact of said first and second pairs of contacts includes at least one elongated slot formed therein, and wherein said contact is secured to a respective module by at least one threaded connector that extends through said elongated slot, and wherein said elongated slot permits the contact to be moved laterally back and forth and accordingly adjusted on the module to which it is secured.

15. The robotic tool changer of claim 10 wherein one pair of said contacts is fixed to one of said modules and wherein said actuator is also secured to said module having said pair of contacts fixed thereto.

16. The robotic tool changer of claim 16 wherein said fixed contacts and said actuator are mounted on said master module, and wherein said actuator is operative to engage and move said pair of moveable contacts which are disposed on said tool module.

17. The robotic tool changer of claim 15, wherein when said tool and master modules assume a coupled relationship, said first and second pairs of contacts are disposed one over the other.

18. The robotic tool changer of claim 10, wherein each contact of said first and second pairs of contacts is interchangeable with at least one of the other contacts.

19. The robotic tool changer of claim 10, wherein each contact of said first and second pairs of contacts is substantially structurally identically to at least one of the other contacts.

20. The robotic tool changer of claim 18, wherein each contact of said first and second pairs of contacts includes a generally flat plate portion and a connector tab that is integral with said plate portion and extends at an angle generally perpendicular to said plate portion.

21. The robotic tool changer of claim 10, including at least one spring engaged with each movable contact for biasing the movable contact to the extended portion.

22. The robotic tool changer of claim 10, including a support member mounted on a respective module for supporting the pair of movable contacts, and wherein said support member includes a series of spring cavities for receiving and holding a series of springs, and wherein said springs disposed in said spring cavities engage said pair of movable contacts and bias said movable contacts toward the extended position.

23. The robotic tool changer of claim 22, wherein each movable contact supported on said support member is laterally movable thereon, such that the gap between the associated connector tabs may be adjusted such that electrical cables of various thicknesses may be inserted into the gap and connected to said connector tabs.

24. The robotic tool changer of claim 20, wherein said connector tabs of each pair of connectors are adapted to connect to either a kickless cable or one or more shunt cables.

25. The robotic tool changer of claim 24, wherein each contact of said first and second pairs of contacts includes a connector tab, and wherein said connector tabs of each pair are spaced apart to receive the terminal end of a kickless cable, while each connector tab is also adapted to connect to a shunt cable.

26. The robotic tool changer of claim 10, wherein said actuator comprises a pneumatic actuator having a housing and at least one piston reciprocally mounted in the housing.

27. The robotic tool changer of claim 26, wherein said pneumatic actuator includes two pistons mounted in side-by-side relationship, with each piston having a rod connected thereto and extending from said piston through said housing; and a plate disposed exteriorly of said housing and connected to a terminal end portion of each of said rods such that the actuation of said pistons results in relative movement between said housing and said plate.

28. The robotic tool changer of claim 27, wherein one pair of contacts is fixedly secured to the respective module having said pneumatic actuator also mounted thereon, and wherein when the modules are coupled, the retraction of said pistons within said housing results in said housing engaging said movable contacts and moving said movable contacts into electrical contact with said fixed contacts.

29. The robotic tool changer of claim 10, wherein said actuator includes a pair of pistons mounted in side-by-side relationship with each piston including an actuating rod extending therefrom, and wherein each actuating rod includes a terminal end portion that is connected to a connecting plate, whereby the tendency of said rods to rotate is substantially cancelled.

30. The robotic tool changer of claim 10, wherein at least one pair of contacts is adapted to connect to a kickless cable that includes an integral water cooling system for thermally cooling the kickless cable, and wherein the connection of the water cooled kickless cable to said pair of contacts results in the thermal cooling of said contacts.

31. A system for transferring secondary current across a robotic tool changer, comprising:
   a. a master module and a tool module mateable to each other;
   b. a first pair of horizontally aligned contacts slideably mounted to the master module and laterally adjustable thereon, each said contact having a horizontal plate for establishing electrical contact and a vertical connector tab for attachment to an electrical cable;
   c. a pneumatic actuator associated with the master module and selectively moveable between a deployed and a withdrawn position;
   d. a second pair of horizontally aligned contacts, each said contact having a horizontal plate for establishing electrical contact and a vertical connector tab for attachment to an electrical cable, wherein said second pair of contacts are slideably mounted to the tool module and are both laterally adjustable thereon and moveable vertically between an extended and a retracted position;
   e. at least one spring disposed between said tool module and each of said second pair of contacts for biasing said second pair of contacts to the extended position, where said contacts are in spaced apart relation to said first pair of contacts when the master and tool modules are mated; and
   wherein when said actuator is moved to the deployed position, said actuator engages said second pair of contacts and moves said second pair of contacts from the extended position to the retracted position, where said second pair of contacts engages said first pair of contacts and forms an electrical connection therebetween.

32. The system of claim 31, wherein said first and second pair of contacts are generally similar in design, shape and size, and are interchangable.

33. The system of claim 32, wherein said vertical connector tabs of said contacts include a slot formed therein.

34. The system of claim 33, wherein said connector tabs of said contacts are disposed in spaced apart relationship, forming a gap therebetween for accepting an electrical cable terminal.

35. The system of claim 34, wherein the respective contacts of each pair are laterally adjustable with respect to each other such that the width of the gap formed between said connector tabs is adjustable to facilitate attachment of a variety of electrical cable terminals.

36. The system of claim 35, wherein each respective connector tab of each pair of contacts has an inner face proximate the other tab of said pair and an outer face opposite the inner face, and wherein said connector tabs are positioned and adapted to attach a kickless electrical cable between said connector tabs, or two shunt cables, one on the outer face of each said connector tab.

37. The system of claim 36, wherein the kickless cable is water cooled, and wherein when the kickless cable terminal is connected to one of said pair of contacts, said contacts are cooled by the water cooling of the kickless cable.

38. The system of claim 31, wherein said second pair of contacts is electrically insulated from said tool module.

39. The system of claim 31, wherein said first pair of contacts is electrically insulated from said master module.

40. The system of claim 31, wherein said pneumatic actuator comprises at least two cylinders, each said cylinder containing a piston and shaft.

41. The system of claim 40, wherein said pneumatic actuator is limited to rectilinear motion in the axial direction of said cylinders.

42. A robotic tool changer, comprising:
   a. a master module and a tool module adapted to be coupled and decoupled;
   b. a first pair of electrical contacts associated with the master module and a second pair of electrical contracts associated with a tool module;
   c. each contact of each pair including a generally flat plate portion and a connector tab;
   d. at least one of said pair of contacts being movable between an extended and retracted position;
   e. at least one spring for engaging each contact of the movable pair of contacts and biasing the engaged contacts towards the extended position.
   f. wherein when said master and tool modules assume a couple relationship, said first and second pair of contacts are disposed adjacent to each other and wherein when said movable pair of contacts assume the extended position, said first and second pairs of contacts are disposed and spaced apart relationship; and g. an actuator associated with the robotic tool changer for engaging the movable pair of contacts and moving said movable pair of contacts to the retracted position where said movable pair of contacts engage the other pair of contacts and establish an electrical connection between said first and second pairs of contacts.

43. The tool changer of claim 42 wherein the connector tab of each contact is oriented at an angle with respect to the plate portion of the contact and wherein each contact of each pair is interchangeable with one contact of the other pair.

44. The tool changer of claim 42, wherein the contacts of each pair are laterally adjustable on the respective modules such that the distance between the connector tabs of each pair of contacts is adjustable to receive cables of various thicknesses.

45. The tool changer of claim 42 wherein the pair of movable contacts are mounted on the tool module while the other pair of contacts are fixedly secured to the master module and wherein the actuator is also secured to the master module; and wherein the actuation of the actuator results in the actuator engaging the pair of movable contacts and moving the movable contacts from the extended position to the retracted position where the movable contacts engaged the pair of fixed contacts and establish an electrical connection between the master and tool modules.

46. The tool changer of claim 42, wherein each contact of the first pair of electrical contacts associated with the master module includes a connector tab and wherein the connector tabs of the first pair of electrical contacts are adapted to connect directly to a kickless cable.

47. The tool changer of claim 46 wherein the first pair of electrical contacts are laterally adjustable such that the distance between the connector tabs of the first pair of contacts may be adjusted for receiving electrical cables of various thicknesses.

48. A robotic tool changer adapted to connect directly to a kickless cable carrying a secondary current comprising:
  a. a master module and a tool module adapted to be coupled and decoupled;
  b. a pair of contacts secured to the tool module;
  a. a pair of contacts secured to the master module, each of the master module contacts including a contact surface and a connector tab and wherein the pair of master module contacts are arranged and spaced such that the associated connector tabs cooperate to directly receive and connect to the kickless cable; and
  b. wherein when the tool changer assumes a coupled position one pair of the contacts at least partially overlies the other pair of contacts, and wherein one pair of contacts is moveable relative to the other pair of contacts and is biased to assume a spaced-apart relationship relative to the other pair of contacts, and wherein the tool changer is provided with an actuator for engaging the moveable pair of contacts and moving the moveable pair of contacts into engagement with the other pair of contact such that an electrical connection is established between the two pair of contacts.

* * * * *